United States Patent Office 3,443,001
Patented May 6, 1969

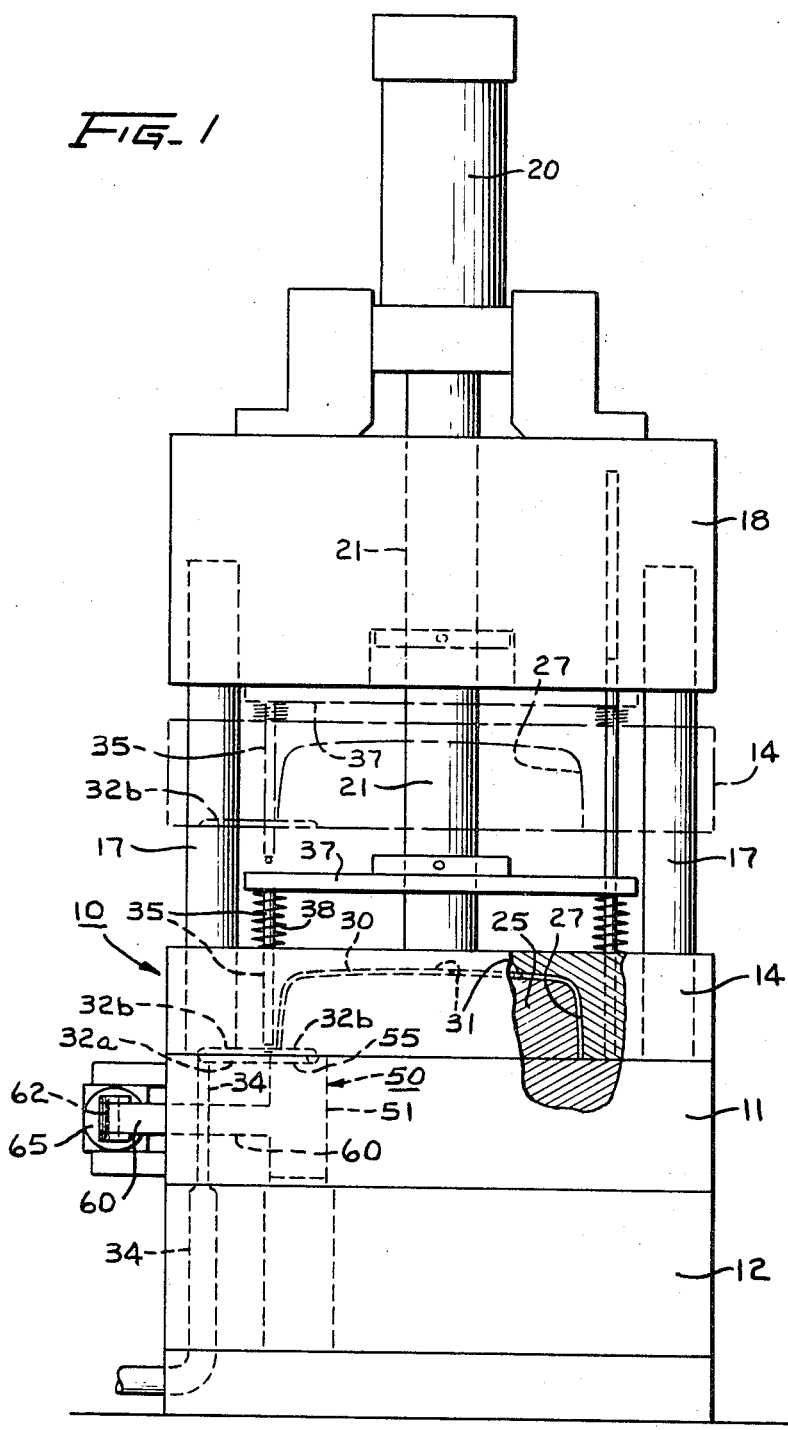

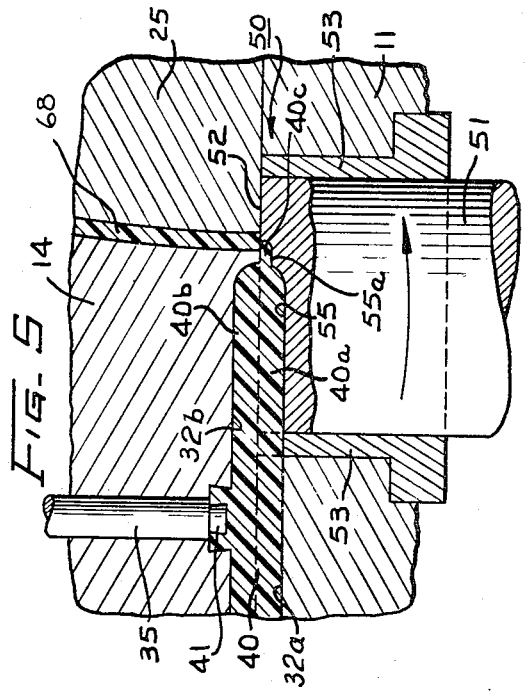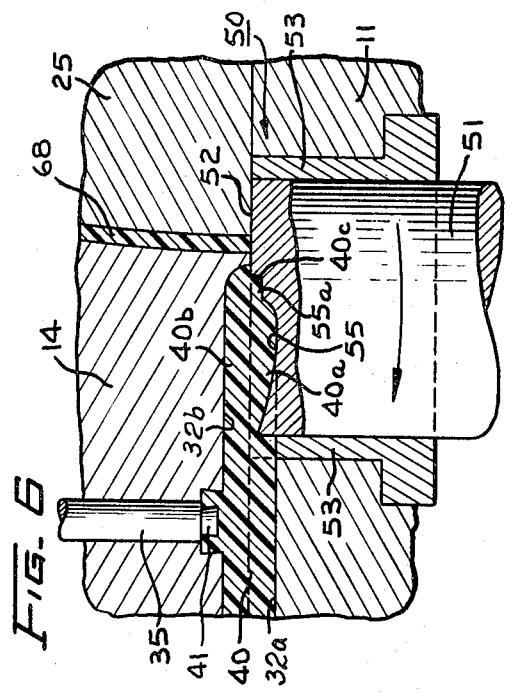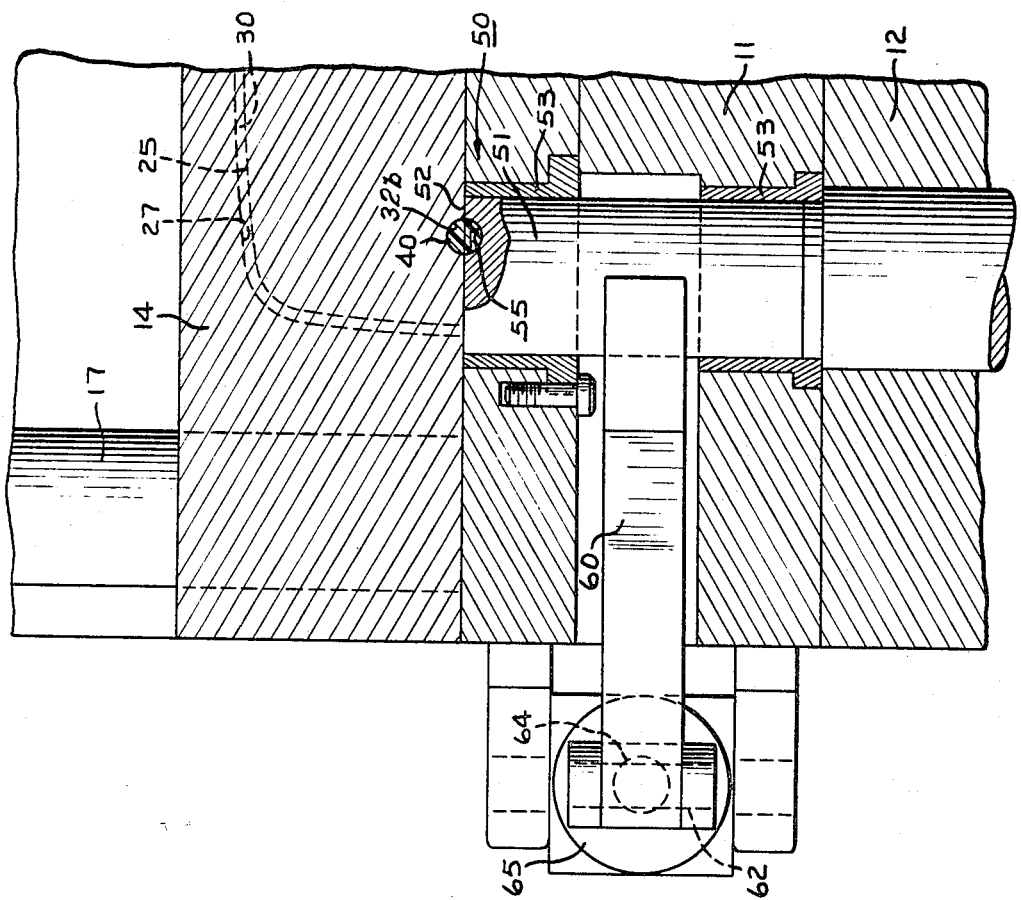

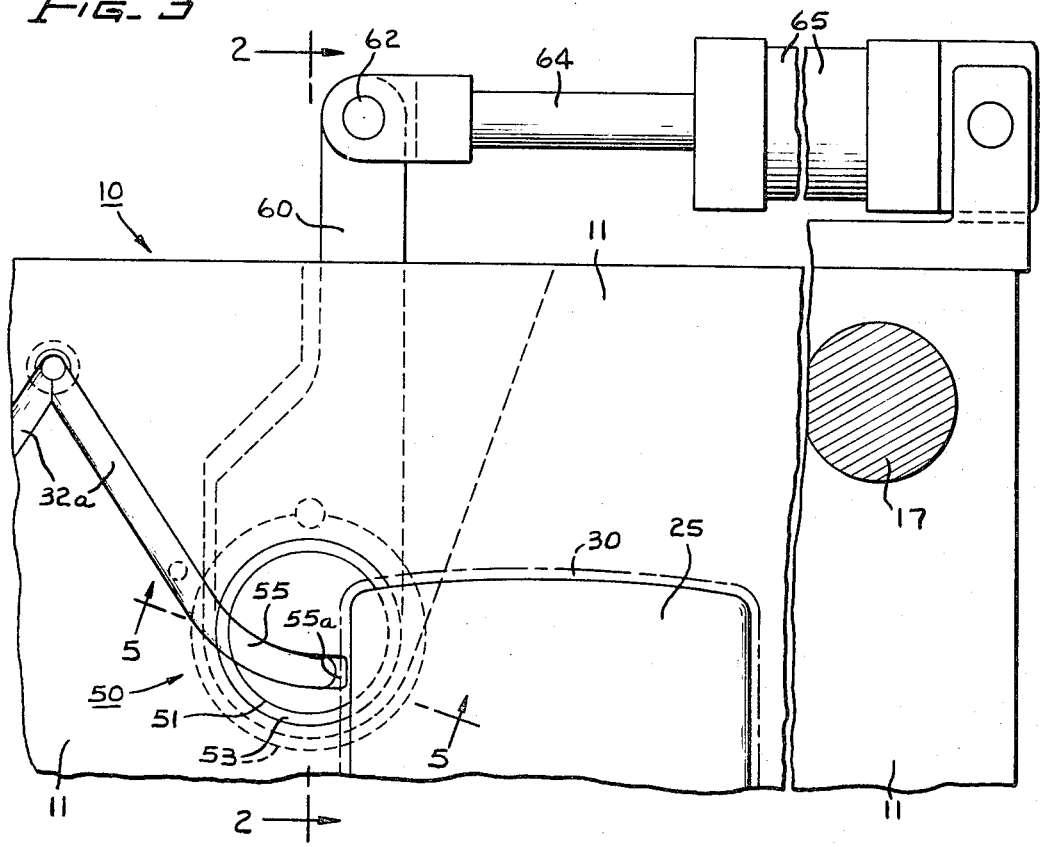
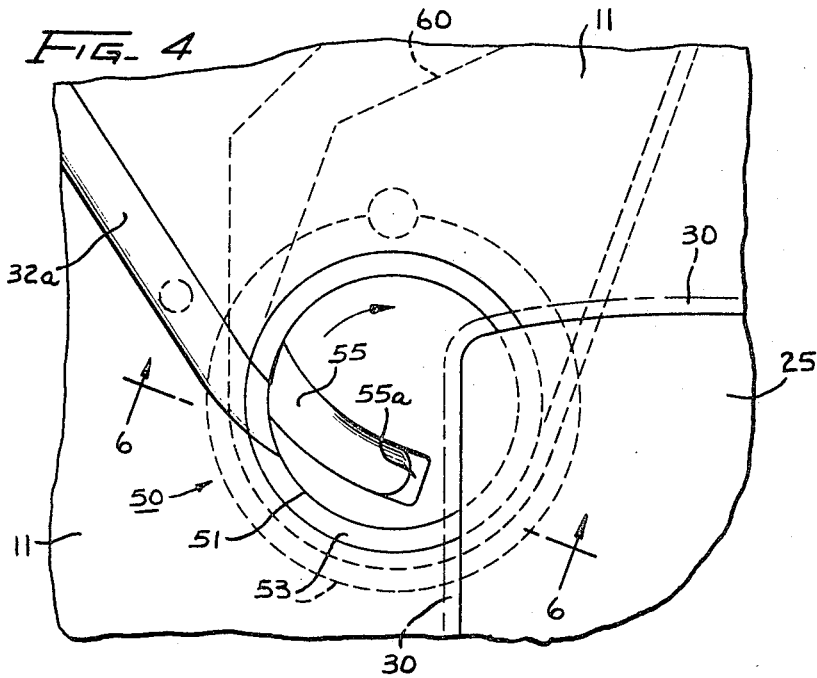

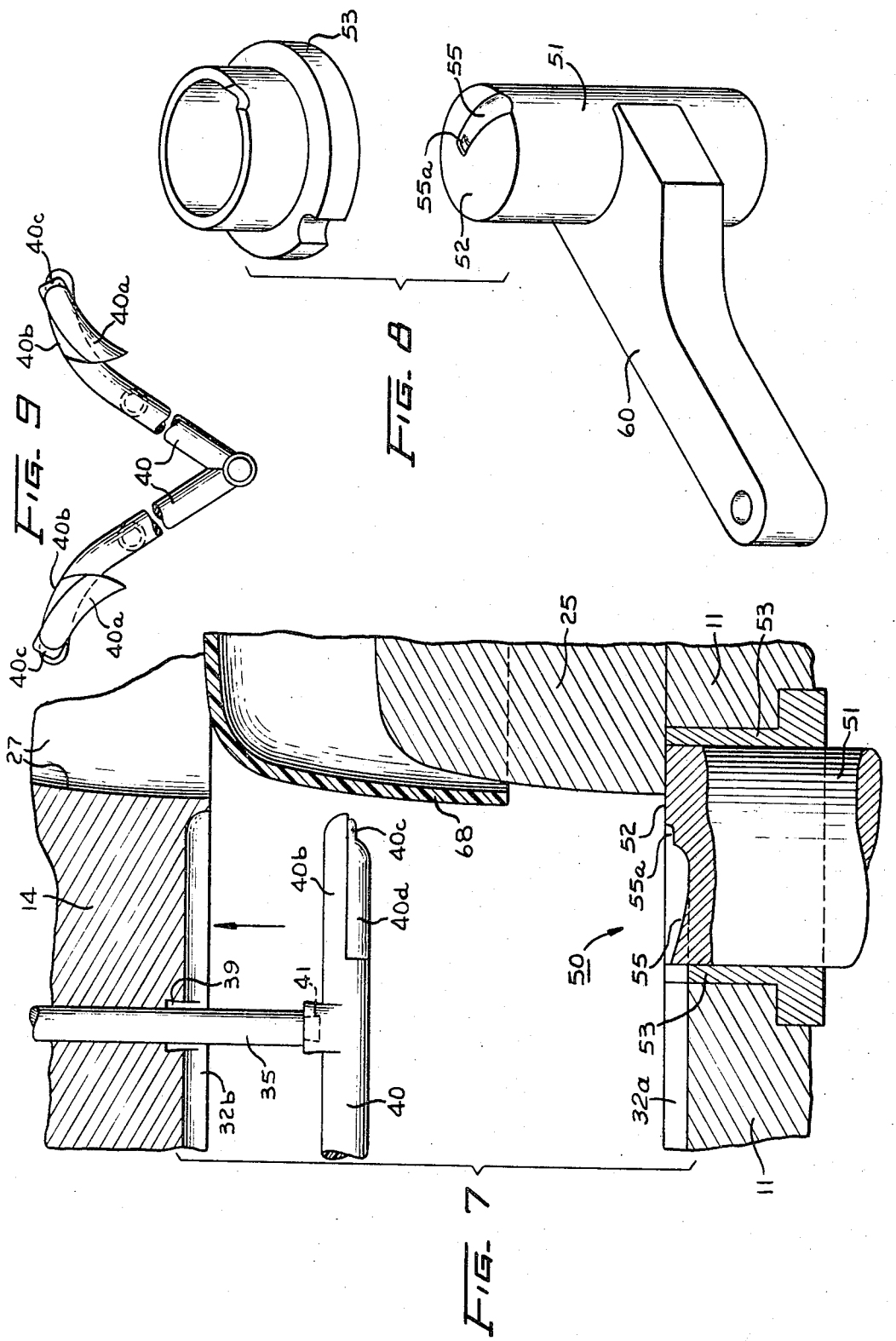

3,443,001
METHOD AND MECHANISM FOR SEVERING THE GATE IN INJECTION-TYPE MOLDS
Frank M. Adair and Emil A. De Boo, Indianapolis, Ind., assignors to Western Electric Company, Incorporated, New York, N.Y., a corporation of New York
Filed Feb. 17, 1966, Ser. No. 528,215
Int. Cl. B29f 1/05
U.S. Cl. 264—161          11 Claims

ABSTRACT OF THE DISCLOSURE

The gate formed in an injection-type mold is severed by effecting relative movement between only a short longitudinal segment of the runner and both the remainder of the runner and the associated molded article. Movement imparted to the runner segment is lateral relative to its original position and of sufficient magnitude to effect the complete severance of a gate-defining end thereof from the molded article, while the remainder of the runner segment is merely offset from the immediately adjacent and stationary portion of the runner previously both aligned and integral therewith. Subsequent cooling results in the offset segment and those areas of the stationary runner remaining in contact therewith healing together sufficiently to allow the entire runner and associated sprue to be ejected from the mold as an integral unit.

---

This invention relates to injection molding and, more particularly, to a method of and a mechanism for effecting relative movement between a portion of a short length of runner and both the remainder of the runner and the associated molded article such that the gate is cleanly severed from the article. It is an object of this invention to provide a new and improved method and mechanism of such character.

In injection molding plastic articles heretofore, the gate associated with the runner for each article has been separated from the molded article either by the manual breaking thereof after the runner and article, as an integral unit, has been removed from the mold, or by mechanically operated gate severing apparatus. Conventional mechanically operated gate severing apparatus are of two basic types, one which simply severs the gate through the operation of a retractable knife blade or cutting tool, the other causing relative and sufficient movement between the molded article and the entire runner such that the gate is severed by such movement.

It is readily apparent, of course, that in large volume applications the manual breaking of the gate associated with each article is both time consuming and often prohibitive from a cost standpoint. Moreover, with respect to certain types of molded articles, such as the housings for telephone sets, for example, manual breaking of the gate would often leave a ragged edge. Such an edge would necessitate an additional step of trimming, buffing and/or polishing the rough, exposed area left on the housing after the gate was broken off therefrom for esthetic reasons, if not also for other reasons, such as to facilitate assembly of closely mating parts or for safety.

With respect to the two aforementioned types of mechanical gate severing apparatus employed heretofore, it has been found that in the one employing a knife blade or tool, the cutting edge thereof tends to become dull with prolonged use. This necessitates periodic replacement or sharpening of the tool, and often leads to tolerance variations in the vicinity of the severed gate. In addition, as the tool progressively wears with repetitive use, the gate severed areas of the molded article often must be touched-up, such as by buffing, especially when a highly polished and smooth appearance is necessary over all of the outer exposed areas of a given article, as is dictated in the molding of telephone housings.

As for the prior art type of mechanically operated apparatus which produces relative movement between the molded article and the entire runner sufficient to effect severing of the associated gate, such apparatus, of course, does not rely on retractable cutting tools to sever the gate and, therefore, obviates the aforementioned problems normally associated with the use of such tools.

However, in order to effect relative movement between the molded article and the entire runner, rather complex, rotatable apparatus dimensioned to very close tolerances are generally required. This becomes particularly apparent when it is realized that either the upper or lower die member (and/or core) of a given mold must be mounted for movement relative to the other die member (and/or core) in the apparatus in question. The problem of effecting the required relative movement between the molded article and the entire runner to sever the gate becomes particularly complex and expensive to resolve in multicavity dies, and especially those for molding articles of substantial size to exacting tolerances and with perfectly smooth external surfaces.

Accordingly, it is another object of this invention to provide a method of and a mechanism for severing the gate of a molded article which neither necessitates the use of retractable gate severing blades or tools or requires relative movement between the entire runner and the molded article.

It is a further object of the present invention to provide a method of and a mechanism for severing the gate from a molded article which leaves an exposed gate severed edge on the article which is both consistently smooth and substantially flush with the exposed surface areas in the immediate vicinity thereof.

It is still another object of this invention to sever the gate of an injection molded article with a mechanism of simplified, inexpensive, reliable and rugged construction.

In accordance with a preferred embodiment of the invention, as encompassed both by a method of and a mechanism for its practice, the gate is severed in an injection-type mold by effecting relative movement between only a longitudinal segment of a short length of runner and both the remainder of the runner and the associated molded article. Movement of the longitudinal segment of runner is in the direction of a small dimension of a gate defined at one end thereof, and is of a magnitude such that while the gate-defining end of the displaced segment of runner is completely severed from the molded article, the remaining segment of greater thickness, is merely offset from a complementary segment of the stationary runner. During the time thereafter necessary both to cool and/or cure the molded article and to open the mold, sufficient healing will have taken place in the contact area remaining between the offset segment and the complementary segment of the main runner to allow the entire runner and associated sprue to be ejected from the mold as an integral unit.

In the preferred structural embodiment of the invention, a circular, rotary operated gate shearing platform with a planar surface is mounted within a precisely dimensioned bore in the lower die member so as to be coplanar with a surface area thereof. The shearing platform includes a short, and at least partial, runner-defining groove therein which extends from one peripheral edge thereof to a point near, but offset from, the center of the platform. The groove is normally in alignment with and forms a continuation of the stationary groove formed in the lower die member, and also preferably forms one-half of a resulting channel or passage for the runner when the upper die member is lowered in mating relationship with the lower die member. The interior end of the groove formed in the platform is contoured to define a gate region of restricted cross-sectional area and is positioned immediately adjacent to and communicates with the article forming cavity within the mold.

In accordance with the principles of the present invention, after an article and the associated runner have been formed in the mold, a small degree of rotation of the rotatable platform effects the necessary lateral displacement of the gate-defining end of the groove therein to completely sever the gate. The dimensions of the platform and the degree of rotation thereof are chosen, however, so as to cause the displaced segment of the runner confined within the groove therein to be only partially offset from the previously aligned and complementary segment of the runner which remains stationary. It is thus seen that the displaceable segment of the runner is laterally moved within a plane which passes through the longitudinal axis thereof and about an axis which is perpendicular to the plane.

As previously mentioned, the period normally required to cool the molded article adequately and to open the mold after the gate has been severed provides sufficient time for the short, offset segment of runner, confined within the groove of the shearing platform, to heeal to the stationary segment of the runner remaining in contact therewith so as to facilitate the ejection of the entire runner and sprue as a single, integral "tree."

As no retractable gate severing blades or tools are required in the present gate severing mechanism, there are no parts which would either tend to wear at an excessive rate and/or which would result in troublesome tolerance variations with prolonged use. The gate severing method and mechanism as embodied herein also produces exposed, severed gate areas on an injection molded plastic article which are substantially more smooth, and more nearly flush with the immediately adjacent surface areas of the article, than are normally realized with apparatus utilizing retractable gate severing tools. In addition, as the lateral displacement of the short segment of runner need be only large enough to effect complete severing of the gate of restricted cross-sectional area (as distinguished from the main runner of larger cross-sectional area), not only the size of the shearing platform, but the driving mechanism to effect limited rotation thereof, may be very compact and of simplified, rugged and economical construction.

These and other objects, features and advantages of the present invention will become more fully understood from a consideration of the following description and related accompanying drawings, in which FIG. 1 is a side elevational view of a typical injection mold incoroprating a gate severing mechanism of the type embodied in the present invention;

FIG. 2 is an enlarged, fragmentary side elevational view in cross-section, illustrating certain structural elements of the injection mold of FIG. 1, which mold incorporates the gate severing mechanism of the present invention;

FIG. 3 is an enlarged, fragmentary plan view of the upper surface of the lower die member of the mold of FIG. 1 and depicts certain structural features of the gate severing mechanism including the runner defining groove therein, and the normal position of the latter relative to the article defining cavity of the mold;

FIG. 4 is an enlarged fragmentary plan view of the gate severing mechanism of FIG. 3 illustrating the position of the runner-defining groove in the upper surface of the gate shearing platform after the latter has been rotated to effect the severing of the gate from the remainder of the runner in accordance with the principles of the present invention;

FIGS. 5 and 6 are enlarged sectional views taken along the lines 3—3 and 4—4 of FIGS. 3 and 4, respectively, and particularly illustrate the positional relationship between the runner, rotatable gate severing platform, gate and molded article both before and after the gate has been severed from the runner, and also illustrate the cross-sectional configuration of the upper and lower segments of the runner in the vicinity of the gate both prior to and after the severing of the latter;

FIG. 7 is a fragmentary, front elevational view, partly in cross-section, illustrating certain structural features of the gate severing mechanism relative to both stationary and movable parts of the mold associated therewith;

FIG. 8 is an exploded, fragmentary view of the rotatable gate severing platform, crank arm and bushing associated therewith, and FIG. 9 is a perspective view of a typical sprue and runner forming a "tree" associated with a particular two-cavity injection mold, constructed to produce telephone housings after the gates associated with the runners have been severed in accordance with the principles of the present invention.

While reference will be made hereinafter primarily to a single runner, gate, article and cavity of the mold disclosed, it is to be understood, of course, that the gate severing mechanism and method of the present invention are applicable both to single and multicavity molds. As a matter of fact, the various views of the mold disclosed herein actually relate to a two cavity mold for use in molding a plastic housing for one particular type of current telephone set.

Considering now the drawings in greater detail, FIG. 1 is a side elevational view disclosing in simplified form the basc parts of a two cavity injection mold designated generally by the reference numeral 10 which incorporates a gate severing mechanism of the type embodying the principles of the present invention. The mold 10 comprises a stationary lower die member 11 mounted on a supporting platen 12 and an upper, vertically movable die member 14, restricted to vertical movement along a plurality of fixed guide support members 17 (only two being shown in FIG. 1). Opposite ends of each support member are respectively secured within recessed bores in the lower die member 11 and in an upper stationary support block 18.

Vertical movement of the upper die member 14 is effected by a hydraulically operated cylinder 20 reciprocally driving a piston 21 connected at its free end to the upper surface of the upper die member 14 by any suitable means. A core insert 25 (best seen in FIG. 7) is affixed to the lower die member 11 and, together with the complementary contoured inner surface 27 formed in the bottom surface of the upper die member 14 defines a cavity 30 therebetween when the mold is closed. This particular cavity produces a thin-walled, rectangularly-shaped telephone housing completely open at the bottom and having a cylindrical opening in the upper surface thereof, formed by the raised boss 31 on the upper surface of the core insert 25 as shown in FIG. 1, so as to facilitate the mounting of a telephone dial mechanism therein.

Associated with each of the lower and upper die members 11 and 14 are complementary halves of runner-defining grooves 32a and 32b, respectively, these grooves generally, but not necessarily, being semi-circular in cross-section so as to form a cylindrical channel or passage therebetween when the mold is closed. Communicating with each passage in the multicavity mold is a common sprue-defining channel 34 (FIG. 1) which, together with the runner-defining grooves 32A, 32B, form a plastic "tree" of the type depicted in FIG. 9 after a shot of plastic has been injected into the mold to form an article.

An ejector pin 35 projects downwardly through a bore in the upper die member 14 in slidable relationship thereto (best seen in FIGS. 1 and 7), and is secured at its upper end to a cross member 37 which, in turn, is securely attached by any suitable means to the driving piston 21 connected to the hydraulic cylinder 20. A biasing spring 38 is positioned coaxially of the ejector pin along an upper section thereof and is confined between the lower surface of the cross member 37 and the upper surface of the upper die member 14. As seen from the two positions of the upper die member 14 when closed and opened (the latter being shown in phantom in FIG. 1), upward movement of the upper die member 14 initially results in the cross member 37 abutting against the lower surface of the support block 18. Thereafter, continued upward movement of the die member 14 compresses the biasing spring 38 against the support block so as to cause the lower free end of the ejector pin 35 to project downwardly from the undersurface of the die member.

As depicted in FIG. 7, a small area 39 in the undersurface of the upper die member 14, coaxial of the bore through which the ejector pin 35 passes, is undercut so as to form a small mold cavity which communicates with the groove 32b in the upper die member 14. A small amount of plastic molded in this undercut cavity therefore provides a means for temporarily supporting a runner 40 in groove 32b after the gate has been severed and the mold opened, and before the ejector pin 35 projects downwardly to strip the runner from the groove. A short section of the sprue (best seen in FIG. 9) is also removed from the mold with the runner after the gate has been severed and the mold opened.

For purposes of this disclosure, a short section of the ejector pin 35 at the free end thereof has been shown in FIG. 7 as having an inwardly tapered or undercut shank 41 so that the runner 40 will remain attached to the ejector pin after having been stripped from the groove 32b in the upper die member 14. It should be understood, of course, that the ejector pin may simply be used to strip the severed runner from all parts of the mold and, in that case, there would be no need for an undercut end on the ejector pin. With an undercut section, however, the ejector pin may be employed to hold the severed runner 40 temporarily so that suitable cross-slide mechanisms, for example, may move stripping and receiving members inwardly above and below the runner when in a position such as depicted in FIG. 7. With such apparatus, the stripping member could free the runner from the ejector pin whereby it would fall on the receiving member and either be removed by such member from the mold directly or indirectly in conjunction with a cooperating pusher or ejection member.

Similarly, a plurality of ejector pins (not shown) in the lower die member 11, if spaced apart about the outer periphery of the core insert 25, could be employed in a well-known manner with a cross-slide operated comblike receiving member to facilitate automatic removal of the molded article from the mold. It, of course, becomes readily apparent that the use of ejector pins in combination with suitably positioned and controlled air nozzles may also be employed in many applications to eject the runner and/or article from an injection-type mold. As such runner and article ejection apparatus is neither necessary nor helpful in describing or understanding the principles of the gate severing method and mechanism embodied herein, such ejection apparatus has not been disclosed in detail.

As thus far described, the multicavity mold 10, other than for the specific shape of the cavity defined therein, is of conventional construction and, therefore, as in the case of the ejection apparatus, likewise will not be described herein in greater detail.

In accordance with a preferred method and structural embodiment of the present invention, the gate associated with an article molded in the cavity 30 is cleanly, uniformly and consistently severed from the article without the use of either retractable knife-edged cutting tools or complex apparatus for effecting appreciable relative movement between the entire runner and the molded article.

More specifically, as embodied in the present invention, incremental, lateral movement or displacement is effected between only a portion or segment of a short length of runner adjacent the gate end thereof and both the remainder of the runner, including the complementary segment of the short length of runner, and the associated molded article. Movement of the short segment of runner is in the direction of a small dimension of the gate, and is of a magnitude such that while one end thereof defining the gate is completely severed, the other end thereof, having a greater thickness, is normally merely offset from an adjacent end of the remainder of the runner which is held stationary. It is thus seen that the movable short segment of runner is displaced laterally with respect to its initial position whereat it was in longitudinal alignment and integral with both the complementary stationary segment and the remaining stationary portion of the runner. The period of time necessary to cool and/or cure the molded article sufficiently and to thereafter open the mold enables the adjacent offset ends of the movable and stationary runner sections, as well as any other remaining contact area therebetween to heal to an extent which allows the entire runner and associated sprue to be ejected from the mold as an integral unit.

Considering now in greater detail one preferred structural embodiment of the gate severing mechanism designated generally by the reference numeral 50 in FIG. 1, a cylindrical, rotary-operated member 51, best seen in FIGS. 3, 4, 6 and 8, has an upper circular, planar surface 52 which is accurately positioned by means of a pair of bushings 53 within a bore in the lower die member 11. Surface 52 actually comprises a gate shearing platform and will be referred to as such hereinafter for descriptive purposes. Platform 52 is mounted in the lower die member 11 so as to be coplanar with the upper surface of the latter, and to extend partially beneath the core insert 25.

In accordance with an aspect of the invention, the gate shearing platform 52 has a short, runner-defining groove extension 55 formed therein which extends inwardly from the peripheral edge thereof to an interior terminating point offset from the center of the platform. The interior end of groove 55 is positioned immediately adjacent to one edge of the cavity 30 and is contoured in the region 55 (best seen in FIGS. 5 and 7) such that a narrow channel or passage is defined to provide a gate region for the plastic material to be injected into the cavity 30 of the mold. In its normal position prior to the mold being closed and plastic injected therein, the groove 55 is aligned with both a portion of the complementary runner-defining groove 32b in the bottom surface of the upper die member 14, and with the runner defining groove 32a in the upper surface of the lower die member 11, as best seen in FIGS. 3 and 5.

Rotation of the gate shearing platform 52 is effected by oscillatory movement of a crank arm 60 (best seen in FIGS. 2, 3, 4 and 8), the yoke end of which is secured by any suitable means to the rotary member 51, the upper surface of which forms the platform. The other end of the crank arm is pivotally connected by a pin 62 to a reciprocally driven piston 64 of a double-acting hydraulic cylinder 65 (FIG. 3). Suitable timer apparatus (not shown) would normally be employed to operate the hydraulic 65 in proper sequence with mechanisms employed to open and close the mold and fill the article defining cavity with plastic material during a complete operating cycle.

In accordance with the principles involved in the operation of the gate shearing mechanism 50, the mold is initially closed so as to form both the cavity 30 defined between the complementary surfaces of the core insert 25 and the upper die member 14, and the sprue and runner-defining channels or passages formed by the mating surfaces of the lower and upper die members. At this time, if not before closure of the mold the gate shearing platform 52 is positioned such that the short, runner-defining groove extension 55 therein is in alignment with both the stationary groove 32a formed in the upper surface of the lower die member 11 and with the complementary section of the stationary groove 32b formed in the lower surface of the upper die member 14, as best seen in FIG. 3.

With the various parts of the composite mold so aligned, the desired plastic composition, such as acrylonitrile-butadiene-styrene copolymer referred to as ABS, heated to a suitable temperature, such as in the range of 400 to 450° F., is injected under pressure, such as of the order of 10,000–17,000 pounds per square inch (for molding a telephone housing with the aforementioned plastic composition, temperatures and mold employed), within the cavity 30 through the sprue and runner-defining grooves or channels formed in the mating surfaces of the upper and lower die members.

Upon completely filling the cavity with the heated plastic material, the pressure is generally maintained for a period of five to ten seconds to insure that no voids exist within the cavity. Thereafter, the injected plastic is normally allowed to cool for an additional period of five to ten seconds at which time the partially solidified gate is sheared by actuation of the rotatable platform. An additional ten to fifteen seconds are normally allowed to insure sufficient cooling and/or curing of the molded plastic article before the mold is opened.

FIG. 7 depicts the relative positions of the lower and upper die members 11 and 14, respectively, the core insert 25, a molded plastic housing 65, the gate severing platform 52, and a section of the runner 40, including segments 40a and 40b retained by the free end of the ejector pin 35, after the mold has been opened.

In one particular mold, basically of the type disclosed herein for molding telephone housings, the platform is 1.875 inches in diameter and is rotated clockwise approximately 23½ degrees from the position shown in FIG. 3 to the position shown in FIG. 4 to sever a gate 40c having a width, coplanar with the lower die, of approximately .50 inch, and a thickness of approximately 0.090 inch, as compared to a diameter of approximately 0.375 inch for the main section of runner.

What is important in accordance with the principles of the present invention is that rotation (or any other form of lateral displacement, such as linear or arcuate displacement) of the gate severing platform 52 be sufficient to effect complete severing of the gate-defining end 40c of the short segment of runner 40a confined within the groove 55 of the platform, while leaving at least one surface region thereof in contacting or offsetting relationship with the complementary, and stationary segment 40b of the runner 40. With appreciable contact area remaining between the movable and stationary segments of runner, these mating areas will heal sufficiently when partially cooled so as to permit the entire runner (or runners) and associated sprue to be ejected from the mold when opened as an integral unit.

The effect upon the molded runner in the region of the platform both before and after the latter has been rotated is best seen in FIGS. 5 and 6, respectively. As depicted in FIGS. 6 and 9, only the lower half of the short runner segment 40a, which is confined within the groove 55 in the gate shearing platform is displaced upon rotation of the platform. The substantially squared end 40c of the displaced runner segment 40a (best seen in FIG. 7) is, of course, the thin gate portion which has been cleanly severed from an adjacent lower edge of the molded article 65 upon rotation of the platform. The upper half of the runner segment 40b, which is coextensive with the movable segment 40a before the latter is displaced, remains stationary. As such, the upper half of the entire runner confined within the continuous groove 32b in the upper die member 14, and the main portion of the lower half of the runner confined within the groove 32a in the lower die member 11, constitute a single, integral runner 40 at all times.

The parting line between the stationary and movable runner segments is, of course, defined by the groove-defining edges in the rotatable platform, which edges, when the platform is rotated, not only effect the severing of the gate, but effect the angular displacement of runner segment 40a confined within the groove 55. With the groove 55 in the platform and the complementary section of groove 32b both being semi-circular in the preferred embodiment, it becomes readily apparent that the platform upon being rotated effects the shearing or severing of the runner into matching semi-circular halves along a parting line defined between the coplanar mating surfaces of the platform and the upper die member 14. Such a shearing plane results in considerable contact area remaining between the displaced and stationary runner segments 40a and 40b so as to facilitate the healing of these segments when cooled. Depending on the degree of rotation involved, contact also normally remains between the end of the runner segment 40b opposite the gate and the stationary end of the main runner previously integral therewith.

A method and a gate severing mechanism for its practice have thus been shown wherein no retractable tools involving knife edges are required to sever the gate, nor are other parts involved which would tend to wear at an excessive rate with extensive use. Also in accordance with the present invention, physical movement of the platform can be restricted to what actually amounts only to an incremental degree of rotation sufficient to sever a gate of restricted cross-sectional area. The remainder of the displaced section of runner, normally of larger cross-sectional area, is thereby merely offset relative to the remainder of the runner held stationary. Advantageously, when movement of the gate shearing platform is rotary, the platform may be of relatively small diameter which in turn, allows not only the shearing platform per se, but the driving mechanism to effect limited rotary motion of the platform, to be compact, simplified in operation, rugged and economical to construct.

The method and gate severing mechanism for its practice as embodied herein also are characterized by the fact that even with extensive use, the exposed severed gate areas on an injected molded plastic article are consistently more smooth and more nearly flush with the immediately adjacent surface areas of a molded article than are normally realized or possible with conventional gate severing apparatus utilized heretofore.

It is to be understood that the specific method and apparatus for its practice described herein are merely illustrative of the general principles of the present invention. Various other modifications may be devised in light of this disclosure by one skilled in the art without departing from the spirit and scope of this invention.

What is claimed is:

1. A method of severing a gate associated with a runner from an article in an injection type mold, comprising the steps of:

forming a main section of molded runner within a stationary passage defined within the mold;

forming a short longitudinal section of molded runner including a gate-defining end thereof within a short, runner-defining passage, at least a longitudinal portion of which passage is movable within a plane which passes through the longitudinal axis thereof, and which passage is normally longitudinally aligned with the main stationary runner-defining passage of the mold, the short section of molded runner initially formed in said short passage thereby being both integral and longitudinally aligned with the stationary main section of molded runner;

displacing the movable longitudinal portion of the short runner-defining passage within said plane sufficiently such that the gate-defining end of the portion of the short section of runner confined therein is completely severed from the molded article, while the opposite end of the displaced portion of runner is at least offset from the stationary main section of molded runner previously both integral and aligned therewith, and allowing those areas of the displaced portion of the short section of runner and of the remainder of the runner which are still in contacting relationship to heal sufficiently upon cooling so as to again form an integral runned which facilitates the ejection thereof upon opening of the mold.

2. A method in accordance with claim 1 wherein the step of forming a short section of molded plastic runner for movement comprises forming only a short longitudinal segment of said section of runner for movement, with a complementary and initially coextensive longitudinal segment of the molded section of runner remaining stationary.

3. A method in accordance with claim 1 wherein the step of displacing the movable longitudinal portion of the short runner-defining passage is effected by imparting rotational movement thereto within said plane and about an axis perpendicular to said plane.

4. A method in accordance with claim 1 wherein the step of forming a short longitudinal section of molded plastic runner for movement comprises forming only a short, longitudinal segment of said section of runner for movement, with a complementary and initially coextensive longitudinal segment of said section of molded runner remaining stationary, and wherein the step of displacing the movable longitudinal portion of the short runner-defining passage is effected by imparting rotational movement thereto within said plane and about an axis perpendicular to the axis of said plane.

5. A method of severing a gate of smaller cross-sectional area than the runner associated therewith from an article in an injection type mold, comprising the steps of:
    forming a short longitudinal section of molded plastic runner including a laterally movable, longitudinal segment and a complementary and coextensive stationary segment, the movable segment defining a gate at one end thereof with the other end normally being both integral and longitudinally aligned with a main stationary section of molded runner;
    imparting a predetermined degree of lateral displacement to the movable short segment of runner such that the gate-defining end thereof is completely severed from the molded article while the remainder of the short segment of runner is merely offset from the complementary and initially aligned segment of runner which remains integral with the main stationary section of runner, and
    allowing at least the portions of the offset segment of the short section of runner and the complementary stationary segment of the short section of runner which remain in contacting relationship to cool until said portions have healed sufficiently so as to again form an integral runner which facilitates the ejection thereof upon opening of the mold.

6. A gate severing mechanism for use in severing a gate from a molded article in an injection type mold which includes upper and lower die members defining an article forming cavity and a runner-defining passage therebetween when closed, comprising:
    a movable member having an upper surface defining a planar, gate severing platform mounted within a recess of the lower die member of the mold, said platform being positioned so as to have at least one surface area thereof substantially coplanar with a surface of the lower die member in the region immediately adjacent an article-defining cavity area of the mold, said platform having a laterally movable groove therein dimensioned to form at least a portion of a short, runner-defining passage, said groove extending laterally from one peripheral edge of the platform to at least an interior terminating point whereat the groove is contoured to define a gate forming passage which communicates with the cavity defined by the mold, the end of said movable groove which terminates at the periphery of said platform normally being aligned with the adjacent terminating end of the stationary passage defined by said upper and lower die members;
    means for moving said platform a predetermined distance, after plastic material has been injected into the mold through the initially aligned runner-defining passages, such that the groove in said platform is laterally displaced sufficiently to completely sever a molded gate formed at one end thereof from a molded article, while the portion of the molded runner confined within said groove is merely offset from the main stationary portion of the molded runner previously both aligned and integral therewith, whereby upon cooling, those areas of the offset and stationary portions of the runner which remain in contacting relationship heal together sufficiently to again form an integral runner which facilitates the ejection thereof from the mold when opened.

7. A gate severing mechanism in accordance with claim 6 wherein said movable member is rotatable and wherein said platform is circular.

8. A gate severing mechanism in accordance with claim 6 wherein said groove formed in said platform forms only a short, longitudinal segment of the molded runner, whereby said means for moving the platform moves only the segment of said runner confined within the groove thereof by said predetermined distance.

9. A gate severing mechanism in accordance with claim 6 wherein said movable member is rotatable, said platform formed therein is circular, and said groove therein extends laterally inwardly from a peripheral edge of said platform to a terminating point which communicates with the cavity defined by said mold, and wherein a predetermined degree of rotation of said platform effects rotation of only a longitudinal segment of a molded runner confined within the groove thereof, said rotation being sufficient for the gate-defining end of said segment of the runner to be completely severed from a molded article while the remainder of said rotated segment of runner is merely offset from a stationary segment of runner which was previously both coextensive and integral therewith.

10. A gate severing mechanism for use in severing a gate from a molded article in an injection type mold which includes upper and lower die members defining an article forming cavity and a runner-defining passage therebetween when closed, comprising:
    a rotatable member, including an upper surface defining a planar, circular gate severing platform mounted within a bore in the lower die member of the mold, said platform being positioned so as to be substantially coplanar with a surface of the lower die member in the region immediately adjacent an article-defining cavity area of the mold, said platform having a groove therein dimensioned to form a short, coextensive segment of runner therein, said groove extending laterally from one peripheral edge of the platform to at least an interior terminating point offset from the axis of said platform whereat the groove is contoured to define a gate forming passage which communicates with the cavity defined by the mold;
    means for rotating said platform by a predetermined number of degrees after the mold is closed and plastic material has been injected therein, said rotatable platform normally having the groove therein aligned with both a runner-defining groove in the lower die member and with a complementary runner-defining groove in the upper die member, the degree of rotation of said platform after the plastic material has been allowed to at least partially solidify being sufficient for the gate-defining end of the groove in said platform to completely sever a molded gate formed therein from a molded article, while simultaneously only offsetting the short segment of runner confined within said last-mentioned groove from a complementary and stationary segment of runner previously both aligned and integral therewith, the areas of said rotated and stationary runner segments which remain in contacting relationship healing sufficiently upon cooling to again form an integral runner which facilitates the ejection thereof from the mold when opened.

11. A gate severing mechanism in accordance with claim 10 wherein said means for rotating said platform comprises a reciprocally operated air cylinder, and wherein the degree of rotation of said platform and the dimensions of said groove therein are chosen such that while the gate-defining end of said last-mentioned groove completely severs a molded gate from a molded article, the opposite end of said last-mentioned groove is merely offset from the groove in said lower die member initially in alignment therewith.

References Cited

UNITED STATES PATENTS 2,520,263   8/1950   Vinal _____ 264—161

ROBERT F. WHITE, *Primary Examiner.*

J. H. SILBAUGH, *Assistant Examiner.*

U.S. Cl. X.R.

18—5, 30; 264—328